United States Patent [19]
Fukawa

[11] Patent Number: 4,924,242
[45] Date of Patent: May 8, 1990

[54] THERMAL RECORDING APPARATUS USING A DETACHABLE INK SHEET CASSETTE

[75] Inventor: Kazumi Fukawa, Asaka, Japan

[73] Assignee: Ricoh Company, Ltd., Tokyo, Japan

[21] Appl. No.: 276,395

[22] Filed: Nov. 25, 1988

[30] Foreign Application Priority Data

Nov. 25, 1987 [JP] Japan .......................... 62-180024[U]

[51] Int. Cl.[5] ............................................ G01D 15/10
[52] U.S. Cl. ................................ 346/76 PH; 400/120
[58] Field of Search ............ 400/120 PH; 346/76 PH; 358/296

[56] References Cited

U.S. PATENT DOCUMENTS 4,702,631 10/1987 Watanabe ....................... 346/76 PH

FOREIGN PATENT DOCUMENTS 3438663 5/1985 Fed. Rep. of Germany ... 346/76 PH
0154966 7/1986 Japan ............................. 346/76 PH

*Primary Examiner*—Bruce A. Reynolds
*Assistant Examiner*—Huan Tran
*Attorney, Agent, or Firm*—Oblon, Spivak, McClelland, Maier & Neustadt

[57] ABSTRACT

A transfer type thermal recording apparatus suitable for use in a facsimile machine and the like is provided. The apparatus includes a thermal print head and a sheet of recording paper is transported as pressed against the thermal print head with an ink sheet sandwiched between the recording paper and the thermal print head. An ink sheet cassette is detachably mounted in position and it includes a cassette case, a supply spool around which a roll of ink sheet is wound initially and a take-up spool to which the leading end of the ink sheet is fixedly attached. The cassette case is generally box-shaped and it has four pin receiving portions formed at a pair of opposite side walls of the case. The apparatus also includes a housing in which four pins are disposed in a predetermined arrangement. Thus, the ink sheet cassette can be properly set in position through engagement between the four pins of the housing and the four pin receiving portions of the cassette.

4 Claims, 9 Drawing Sheets

THERMAL RECORDING APPARATUS USING A DETACHABLE INK SHEET CASSETTE

BACKGROUND OF THE INVENTION

1. Field of the Invention

This invention generally relates to a thermal recording apparatus, and, in particular, to a thermal recording apparatus using a detachable ink sheet cassette containing a roll of ink sheet for use in transfer type thermal recording.

2. Description of the Prior Art

Recently, a thermal recording apparatus has been widely used because of its simple nature in mechanism and structure. In particular, a thermal recording apparatus of the type in which an ink sheet is fed together with recording paper to transfer part of the ink of the ink sheet to the recording paper to carry out transfer type recording is often used in various machines, such as facsimile machines.

However, in such a prior art thermal recording apparatus, since an ink sheet was directly mounted on a housing of the apparatus through a spool or the like and the ink sheet was extremely thin, the ink sheet tended to be slackened and creases tended to be formed. In addition, replacement of ink sheets was difficult to carry out.

Under the circumstances, it has been previously proposed to provide a separate ink sheet cassette containing therein an ink sheet extending between a supply spool and a take-up spool, which may be detachably mounted in a thermal recording apparatus of a facsimile machine as disclosed in a Japanese Patent Laid-open Publication No. 63-296971, which has been assigned to the assignee of this application. FIG. 10 illustrates an ink sheet cassette 1 of the invention disclosed in the above-mentioned patent application, and, as shown, it includes a cassette case 2 housing therein an ink sheet 3 which is wound around a supply spool 3*a* (paper tube) and which has its leading end fixedly attached to a take-up spool 4. A pair of support members 5 and 6 is fitted into the opposite ends of the supply spool 3*a*. These support members 5 and 6 are rotatably supported on the cassette case 2 and thus the roll of ink sheet 3 is rotatably supported in the cassette case 2 through the support members 5 and 6 and the supply spool 3*a*. The support member 6 is formed with a knob 6*a* and a gear 6*b*, so that the ink sheet 3 may be rewound manually by grabbing the knob 6*a* and rewinding can also be effected through the gear 6*b*.

A pair of support members 7 and 8 is fitted into the opposite ends of the take-up spool 4, and the support member 8 is formed with a knob 8*a* and a take-up gear 8*b*. The take-up gear 8*b* serves to transmit a rotating force from the main body of the thermal recording apparatus to the take-up spool 4 to thereby have the ink sheet 3 wound around the take-up spool 4.

The cassette case 2 is formed with a pair of pin receiving portions 9 and 10 one on each of the opposite sides of the cassette case 2, and these pin receiving portions 9 and 10 receive therein respective pins provided in the main body of the thermal recording apparatus, as will be made clear later. The ink sheet cassette 1 is detachably set in position inside the thermal recording apparatus through engagement between these pins and the pin receiving portions 9 and 10 of the ink sheet cassette 1.

Thus, at the time of replacement of ink sheets, the entire ink sheet cassettes 1 are replaced, so that replacement of ink sheets can be carried out extremely easily without any skills and experiences, and there is no chance of forming creases and slackness in the ink sheet 3 when set in position.

However, in such a prior art thermal recording apparatus, as described above, since the ink sheet cassette 1 is detachably set in position through engagement between the two pins of the thermal recording apparatus and the two pin receiving portions 9 and 10 of the cassette case 2, the positional accuracy in setting the ink sheet cassette 1 in the associated thermal recording apparatus is not necessarily sufficient and a sufficient accuracy is not necessarily obtained in mesh between gears of the thermal recording apparatus and the associated gears of the ink sheet cassette 1.

SUMMARY OF THE INVENTION

In accordance with the present invention, there is provided a thermal recording apparatus which includes four pins engageable with four pin receiving portions, two on each side, of an ink sheet cassette. The ink sheet cassette is generally rectangular in shape and it contains a supply spool, a take-up spool and a ink sheet initially wound around the supply spool and having its leading end fixedly attached to the take-up spool to be wound around the take-up spool as the ink sheet is used. The ink sheet cassette has a pair of front and rear end surfaces and a pair of side surfaces, and a pair of pin receiving portions is formed at each of the pair of side surfaces as spaced apart from each other along the longitudinal direction of the side surfaces. In this manner, since the ink sheet cassette is detachably set in position through engagement between four pins of the thermal recording apparatus and four pins of an ink sheet cassette, the ink sheet can be set in position at high accuracy at all times. Moreover, an engagement between a force transmitting means of the thermal recording apparatus and a force transmitting means of the ink sheet cassette can be established securely at all times. Thus, the ink sheet can be securely wound and/or rewound once set in position.

It is therefore a primary object of the present invention to provide an improved thermal recording apparatus.

Another object of the present invention is to provide an improved thermal recording apparatus having a detachably mountable ink sheet cassette.

A further object of the present invention is to provide an improved transfer type thermal recording apparatus using a detachable ink sheet cassette.

A still further object of the present invention is to provide an improved transfer type thermal recording apparatus suitable for use in facsimile machines.

A still further object of the present invention is to provide improved thermal recording apparatus which permits a detachable ink sheet cassette to be set in position at high accuracy without skills and experiences.

A still further object of the present invention is to provide an improved thermal recording apparatus easy to use and capable of providing recorded image of high quality at all times.

Other objects, advantages and novel features of the present invention will become apparent from the following detailed description of the invention when considered in conjunction with the accompanying drawings.

DESCRIPTION OF THE PREFERRED EMBODIMENTS

Figure 1:
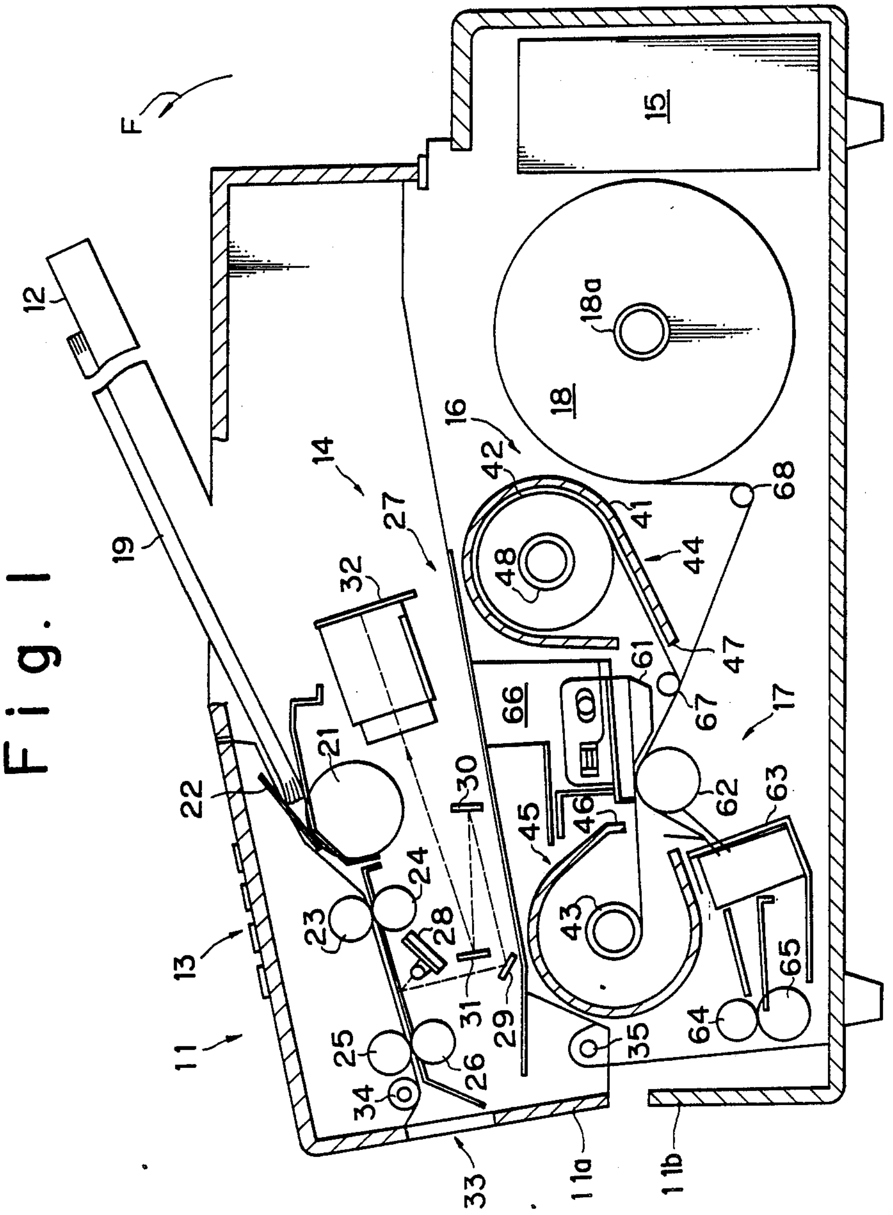
FIG. 1 is a schematic illustration showing the overall structure of a facsimile machine incorporating a thermal recording apparatus constructed in accordance with one embodiment of the present invention.

FIGS. 1 through 9 illustrate a facsimile machine incorporating a thermal recording apparatus constructed in accordance with one embodiment of the present invention. FIG. 1 illustrates a facsimile machine 11 which includes an upper housing 11*a* and a lower housing 11*b*. The upper housing 11*a* is provided with an original table 12, an operating unit 13, and an original reading unit 14, and the lower housing 11*b* is provided with a control unit 15, an ink sheet cassette 16, a recording unit 17, recording paper 18 and various sensors (not shown). The original table 12 is a table for placing thereon a number of originals 19 to be transmitted. The operating unit 13 is provided with various keys, such as a start key and numeric keys, various switches, such as control switches, and display units, and the operating unit 13 is an interface between an operator and the machine which serves to supply command signals for controlling the operation of various parts of the facsimile machine 11.

The original reading unit 14 includes an ADF roller 21, a separation rubber plate 22, feed rollers 23, 24, 25 and 26, and reading means 27. The ADF roller 21 is a roller for automatically feeding documents, such as originals stacked on the original table 21, and it is driven to rotate by means of a driving source (not shown) to feed the originals 19 stacked on the original table 12 one by one in cooperation with the separation rubber plate 22 toward feed rollers 23, 24, 25 and 26. These feed rollers 23 through 26 rotate at the same speed to transport an original 19 which has been fed by the ADF roller 21 at a predetermined speed in an auxiliary scanning direction. The reading means 27 includes a light source 28, mirrors 29, 30 and 31 and a line image sensor 32. Use is made of a fluorescent light as the light source 28 for irradiating the original 19 across its widthwise direction along a line. The light thus irradiated is reflected by the surface of the original 19 and the reflected light is guided to impinge upon the line image sensor 32 by the mirrors 29 through 31. The line image sensor 32 includes a CCD comprised of a plurality of photo-electric elements, so that the image of the original 19 which is being transported by the feed rollers 23 through 26 is optically read line by line from its leading edge to its trailing edge, whereby the optical image is converted into an electrical image signal which is then supplied to the control unit 15.

Upon completion of reading by the reading means 27, the original 19 is discharged out of the upper housing 11*a* through a discharge port 33 by means of transport rollers 25 and 26 and the original 19 thus discharged rests on a paper tray (not shown) which is attached to the upper housing 11*a*. A first support member 34 is provided in the upper housing 11 in the vicinity of the paper discharge port 33, and a part of the upper housing 11*a* which includes the operation unit 13 may be pivotted open and closed around the first support member 34 with respect to the rest of the upper housing 11*a*. With this structure, maintenance operation of the original reading unit 14 can be carried out with ease because of improved accessibility to the original reading unit 14. A second support member 35 is provided below the first support member 34 and a junction between the upper and lower housings 11*a* and 11*b*, and the upper housing 11*a* may be pivotted to be open or closed around the second support member 35 with respect to the lower housing 11*b* which remains stationary. As a result, a maintenance operation of the recording unit 17 can be carried out with ease and replacement of ink sheet cassettes and mounting of a new roll of recording paper 18 can be carried out extremely easily since the upper housing 11*a* can be pivotted open with respect to the lower housing 11*b*. Although not shown specifically, it is so structured that the upper housing 11*a* is locked to the lower housing 11*b* when the upper housing 11*a* is pivotted closed with respect to the lower housing 11*b* by means of a lock mechanism (not shown).

The ink sheet cassette 16 is detachably mounted in position in the lower housing 11*b* and it includes a cassette case 41 which contains therein a supply spool 48, a roll of an ink sheet wound around the supply spool 48 and a take-up spool 43. The cassette case 41 is, for example, comprised of a resin, such as ABS resin, and the interior of the cassette case 41 is defined with a supply section 44 for storing therein a unused roll of ink sheet 42 wound around the supply spool 48 and a take-up section 45 for storing therein a used roll of ink sheet 42 wound around the take-up spool 43. The supply and take-up sections 44 and 45 are spaced apart from each other over a predetermined spacing which is determined in relation to the sizes and arrangement of such elements as a thermal print head 61, a platen roller and a guide roller 67 of the recording unit 17, as will be described further in detail later. That is, the top side of the cassette case 41 is formed with a top opening 46 which is provided between the supply section 44 and the take-up section 45 to allow the thermal print head 61 and the guide roller 67 to move into the interior of the cassette case 41. On the other hand, the bottom side of the cassette case 41 is formed with a bottom opening 47 at a location substantially opposite to the top opening 46 so that the platen roller 62 may move into the interior of the cassette case 41 through the bottom opening 47.

As the ink sheet 42, use may, for example, be made of an ink sheet comprised of a base layer of polyester and a heat-transferrable ink layer applied to the base layer. The ink layer 42 is initially wound around the supply spool 48 before use. The leading end of the ink sheet 42 is fixedly attached to the take-up spool 43 and thus the ink sheet 42 becomes wound around the take-up spool 43 after use.

Figure 2:
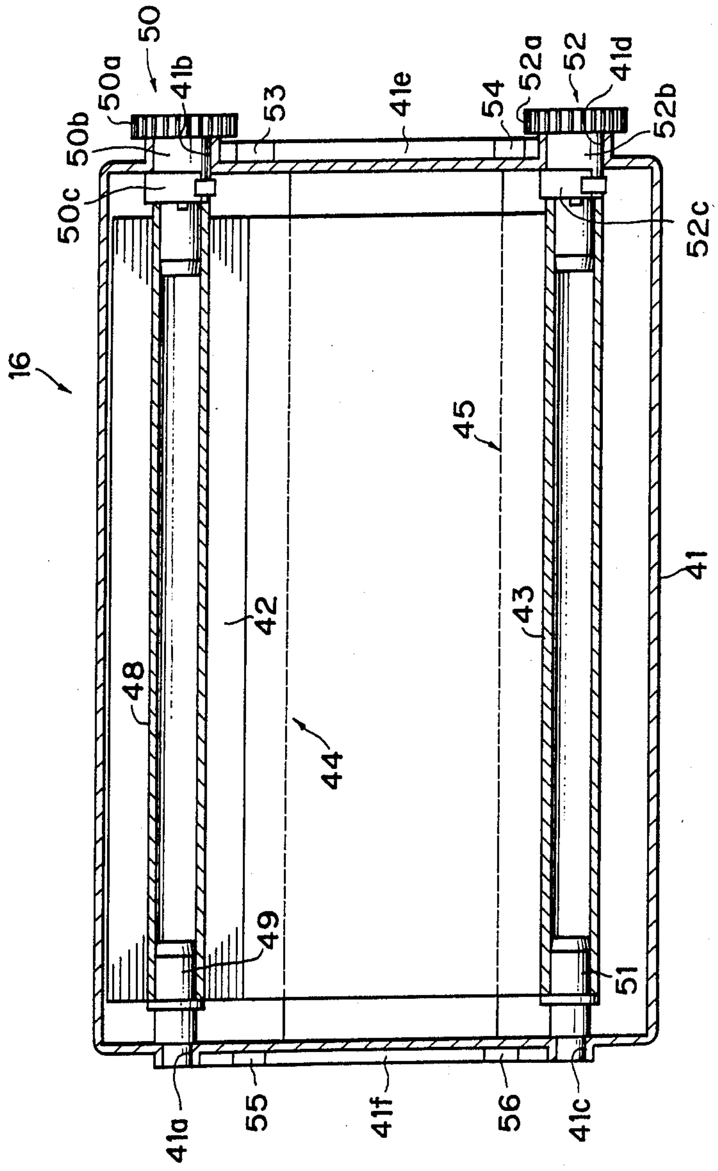
FIG. 2 is a schematic illustration showing the overall structure of an ink sheet cassette which is detachably set in position in the thermal recording apparatus of the facsimile machine shown in FIG. 1.

The overall structure of the cassette case 41 and the arrangement of the supply and take-up spools 48 and 43 inside of the cassette case 41 are shown in FIG. 2. A roll of unused ink sheet 42 is initially wound around the supply spool 48 which has support members 49 and 50 fitted into the opposite ends thereof, and the support members 49 and 50 are rotatably supported by the cassette case 41. The support member 50 is formed with a rewind gear 50*a* and has a shaft portion 50*b* to which a stopper member 50*c* is fixedly attached to prevent the support member 50 from slipping away from the supply spool 48. That is, the stopper member 50*c* may come into sliding contact with the inner surface of the cassette case 41 to prevent the support member 50 from slipping away from the supply spool 48, so that the support member 50, together with the support member 49, supports a roll of unused ink sheet 42 rotatably through the supply spool 48. A pair of support members 51 and 52 is fitted into the opposite ends of the take-up spool 43 and these support members 51 and 52 are rotatably supported by the cassette case 41. The support member 52 is formed with a take-up gear 52*a*, and, similarly with the support member 50, the support member 52 has a shaft portion 52*b* having a stopper member 52*c* fixedly attached thereto. Thus, the support members 49 and 51 have their one ends fitted into the corresponding ends of the supply and take-up spools 48 and 43, respectively, and have their opposite ends rotatably fitted into respective holes 41*a* and 41*c* formed in the side wall of the cassette case 41. The support members 50 and 52 are fitted into respective holes 41*b* and 41*d* formed in the side wall of the cassette case 41 and then into the corresponding ends of the supply and take-up spools 48 and 43. Then, the stopper members 50*c* and 52*c* are fixedly attached to the respective shaft sections 50*b* and 52*b* of the respective support members 50 and 52. Accordingly, the ink sheet cassette 16 may be assembled quite easily.

As described above, the supply spool 48 around which a new roll of ink sheet 42 is wound and the take-up spool 43 to which the leading end of the ink sheet 42 is fixedly attached are rotatably supported in position in the cassette case 41 through the support members 49, 50, 51 and 52. The rewind gear 50*a* of the support member 50 and the take-up gear 52*a* of the support member 52 are located outside of the cassette case 41, and the rewind gear 50*a* and the take-up gear 52*a* are brought into mesh with respective gears 83*b* and 86*b* of a driving means 69, which will be described in detail later, to thereby establish a power transmission train for transmitting a power from the driving means 69 to the ink sheet 42 and also to the take-up spool 43 when the ink sheet cassette 16 is set in position in the recording unit 17. Thus, when power is transmitted to the rewind gear 50*a*, the ink sheet 42 is rewound around the supply spool 48; on the other hand, when power is transmitted to the take-up gear 52*a*, the ink sheet 42 is wound around the take-up spool 43. Thus, the rewind gear 50*a* of the support member 50 and the take-up gear 52*a* of the support member 52 constitute a part of the power transmitting train.

Figure 3:
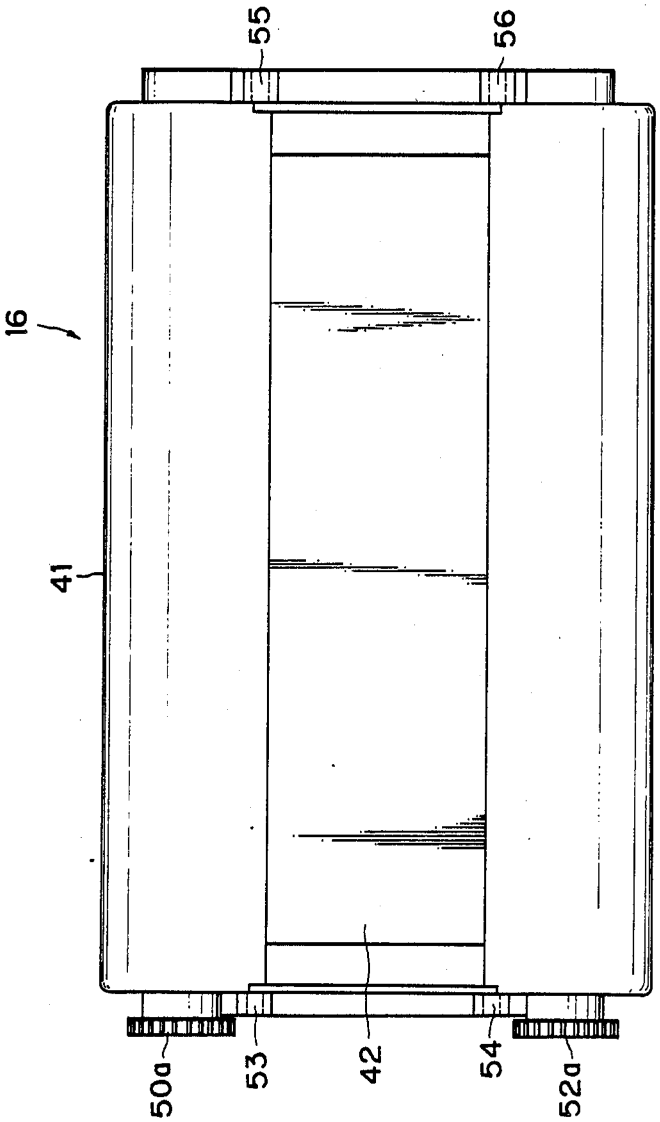
FIG. 3 is a plan view showing in schematic the top of the ink sheet cassette shown in FIG. 2.
Figure 4:
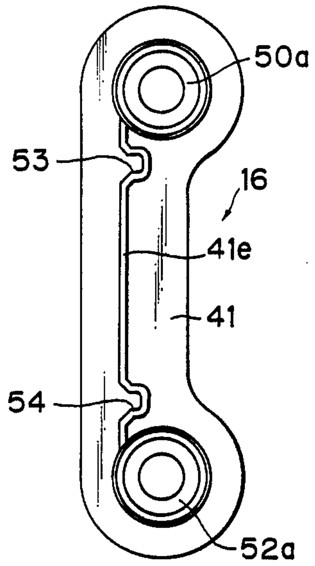
FIG. 4 is a left-hand side elevation showing in schematic the left-hand side of the ink sheet cassette shown in FIG. 2.
Figure 5:
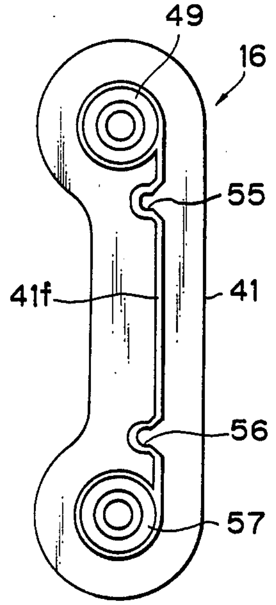
FIG. 5 is a right-hand side elevation showing in schematic the right-hand side of the ink sheet cassette shown in FIG. 2.

As shown in FIGS. 3 through 5, the cassette case 41 has a pair of opposite side walls to which the support members 49 through 52 are rotatably mounted, and each of the side walls is formed with a pair of pin receiving portions 53–54 and 55–56, respectively. Described more in detail, in the illustrated embodiment, each of the side walls of the cassette case 41 is formed with a projection 41*e* or 41*f* which projects outwardly extending along the longitudinal direction of the side walls. And, the projection 41*e* or 41*f* is partly bent at two locations to define a pair of pin receiving portions 53 and 54 or 55 and 56, as best shown in FIGS. 4 and 5. As will be described later in detail, these pin receiving portions 53 through 56 will receive corresponding pins provided in the main body of the facsimile machine 11, as will be described later.

Figure 6:
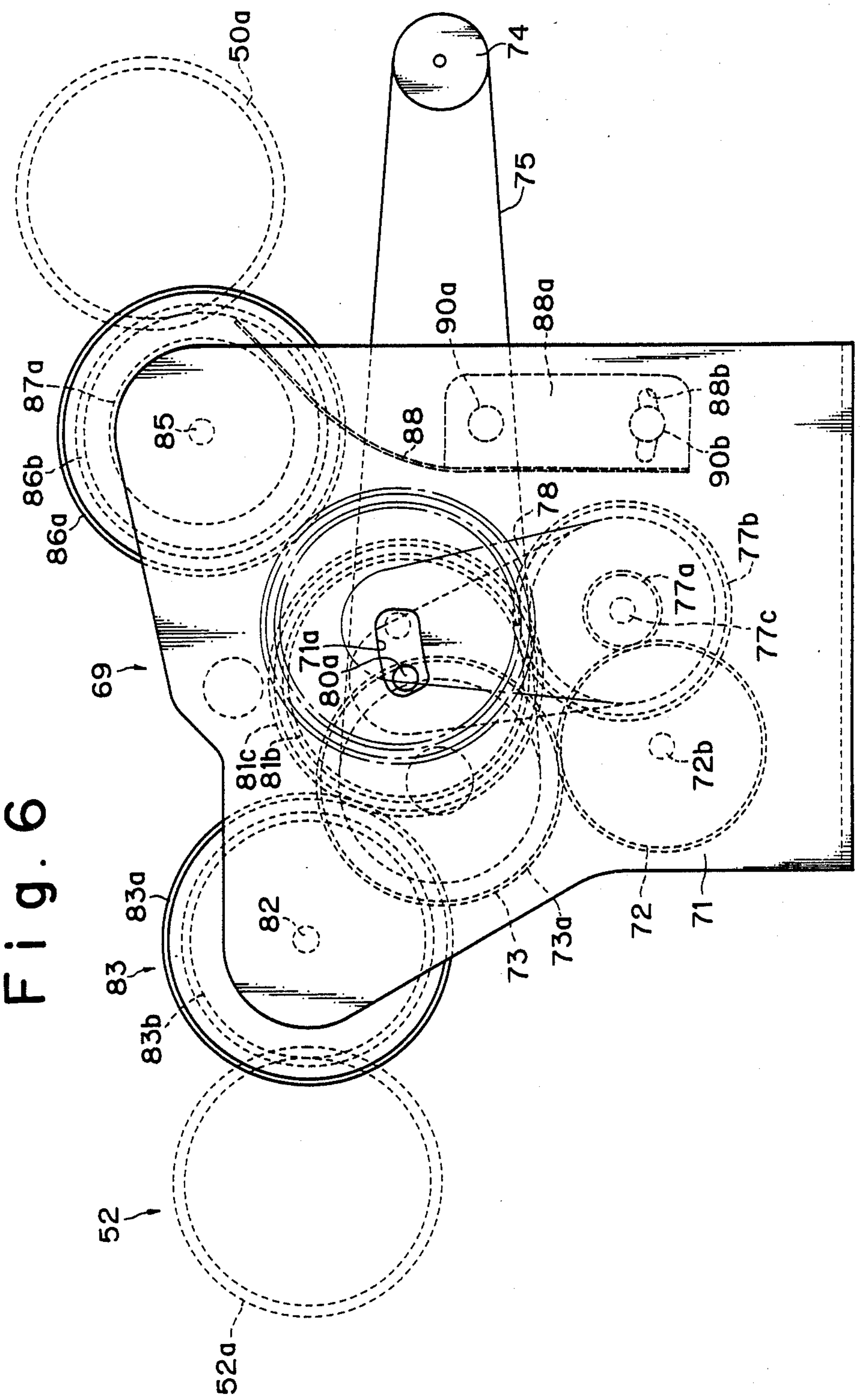
FIG. 6 is a schematic illustration showing a drive mechanism of the facsimile machine of FIG. 1.

Returning to FIG. 1, the recording unit 17 includes a thermal print head 61, a platen roller 62, a cutter unit 63, paper discharge rollers 64 and 65, a head bracket 66, guide rollers 67 and 68 and a drive mechanism 69 (see FIG. 6). The thermal print head 61 is provided with a plurality of heat-producing (preferably resistor) elements arranged spaced apart from each other at a predetermined pitch extending in a widthwise direction of the recording paper 18. The thermal print head 61 selectively defines a heat pattern in accordance with image information supplied from the control unit 15 to thereby cause the ink layer of the ink sheet 42 sandwiched between the platen roller 62 and the thermal print head 61 to melt selectively, whereby the melted portion of the ink layer is transferred to the recording paper 18. The thermal print head 61 is supported by the head bracket 66 which in turn is fixedly attached to the bottom of the upper housing 11*a*.

The head bracket 66 is provided with a pressure mechanism (not shown) which presses the heat-producing elements of the thermal print head 61 against the platen roller 62 to thereby provide an increased contact between the heat-producing elements and the platen roller 62. Thus, when the upper housing 11*a* is pivotted open around the second support member 35 with respect to the lower housing 11*b*, the thermal print head 61 is separated away from the platen roller 62; on the other hand, when the upper housing 11*a* is pivotted closed relative to the lower housing 11*b*, the thermal print head 61 is brought into pressure contact with the platen roller 62. The platen roller 62 is driven to rotate by a driving force transmitted from a drive motor 74 to thereby cause the recording paper 18 to advance toward the cutter unit 63 in the auxiliary scanning direction line by line. And, the platen roller 62 also reversely rotates to cause the recording paper 18 to be returned after severing by the cutter unit 63 to thereby minimize the leading margin from the leading edge to a recording start position of the recording paper 18, e.g., in the order of 2 mm. The cutter unit 63 is provided with a paper cutting mechanism for cutting the recording paper 18 which has been transported to a desired length. That portion of the recording paper 18 which has been cut by the cutter unit 63 is then transported further by rollers 64 and 65 to be discharged onto a paper tray (not shown).

The paper discharge rollers 64 and 65 are normally kept in pressure contact; however, when the upper housing 11*a* is pivotted open relative to the lower housing 11*b*, the paper discharge roller 64 is moved upward over a predetermined amount so that a predetermined gap is defined between the paper discharge rollers 64 and 65, thereby allowing to set recording paper 18 in position with ease. The guide rollers 67 and 68 are, for example, comprised of a metal, and the guide roller 67 is mounted on the head bracket 66 with the guide roller 68 having its both ends rotatably supported by a bracket (not shown) which is mounted on the upper housing 11*a*, so that they contribute to define transportation paths for ink sheet 42 and recording paper 18. Thus, when the upper housing 11*a* is pivotted open with respect to the lower housing 11*b*, the guide roller 68 moves together with the upper housing 11*a*, and thus a new roll of recording paper 18 may be set in position with ease.

Figure 7:
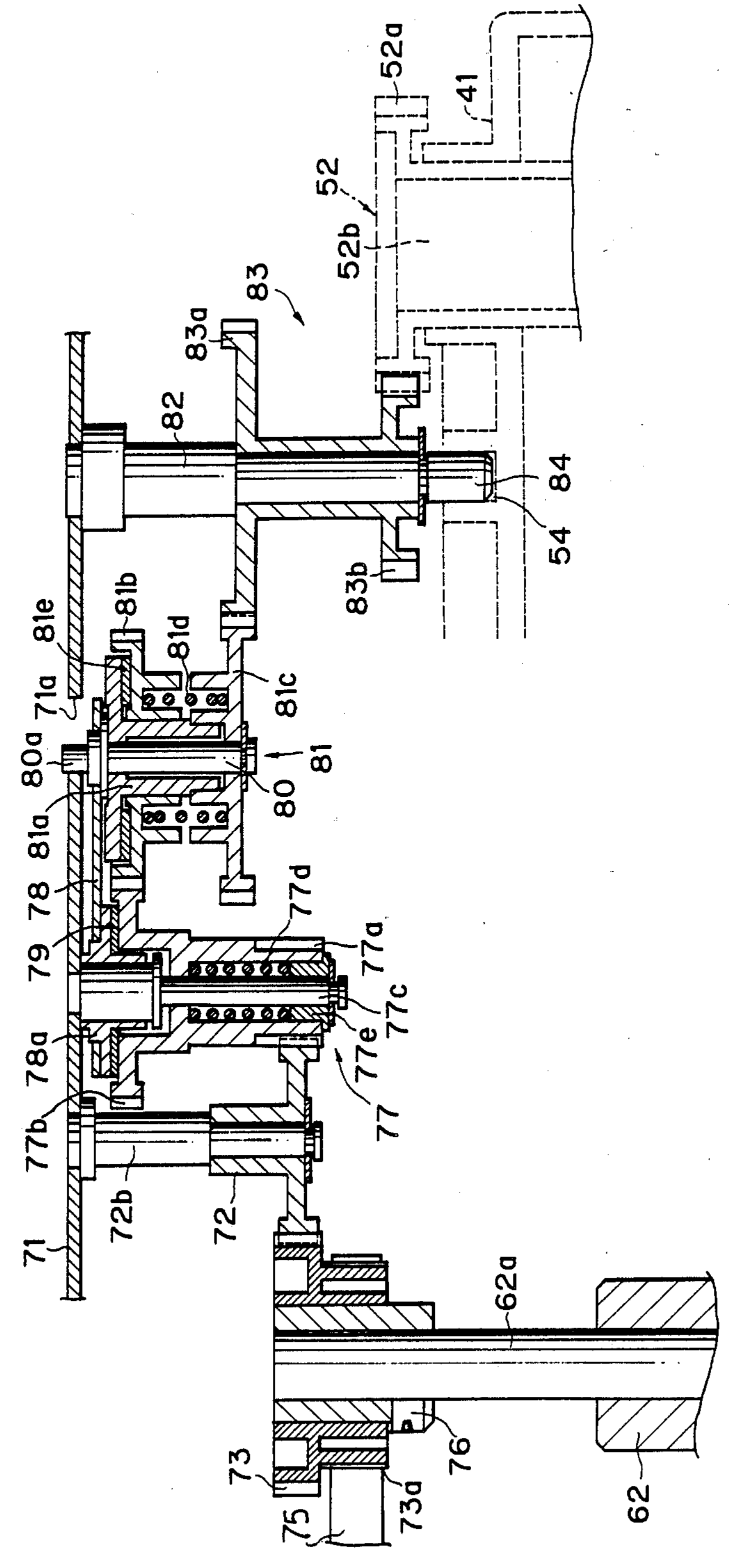
FIGS. 7 and 8 are schematic illustrations showing on an enlarged scale portions of the drive mechanism shown in FIG. 6.

The drive mechanism 69 serves to have the ink sheet 42 taken-up or wound around the take-up spool 43 and have the ink sheet 42 rewound and it has a structure as shown in FIGS. 6 and 7. The drive mechanism 69 is disposed on a gear plate 71 which is mounted on the lower housing 11*b*. A shaft 72*b* is fixedly attached to the gear plate 71 for rotatably supporting an idle gear 72. The idle gear 72 is in mesh with a platen gear 73 which is formed with a belt pulley 73*a*. A belt 75 extends around the belt pulley 73*a* and a pulley of a drive motor 74 (drive means), so that the rotation of the drive motor 74 is transmitted to the belt pulley 73*a* through the belt 75. The platen gear 73 is fixedly attached to a platen shaft 62*a* by means of a set screw 76, so that when the belt pulley 73*a* moves as driven by the drive motor 74, the platen shaft 62*a* and thus the platen roller 62 rotate, together with the platen gear 73.

The idle gear 72 is in mesh with a small diameter gear 77*a* of a clutch gear 77 which, in turn, is in mesh with a large diameter gear 77*b*. The clutch gear 77 is rotatably supported on a shaft 77*c* which is fixedly attached to the gear plate 71, and it is urged toward the gear plate 71 by means of a compression spring 77*d* compressed in a space between the shaft 77*c* and a gear member with the compression spring 77*d* being held in position by the gear member and a bearing 77*e*. Between the gear plate 71 and the large diameter gear 77*b* is disposed a base portion 78*a* of a lever 78 and a felt disc 79 is fixedly attached to that portion of the base portion 78*a* which faces the large diameter gear 77*b*. Thus, a predetermined frictional force may be produced between the large diameter gear 77*b* and the felt disc 79. When the clutch gear 77 rotates, the lever 78 tends to rotate in unison because of this frictional force. A friction gear shaft 80 is fixedly attached at the tip end of the lever 78 and a friction mechanism 81 is mounted on the friction gear shaft 80. The friction mechanism 81 includes a felt disc receiving member 81*a* which is rotatably supported on the friction gear shaft 80, a drive gear 81*b* which is rotatably supported on the felt disc receiving member 81*a*, a follower gear 81*c* which is press-fitted into the forward end of the felt disc receiving member 81*a*, a compression spring 81*d* compressed between the drive gear 81*b* and the follower gear 81*c* for urging the drive gear 81*b* against the felt disc receiving member 81*a*, and a felt disc 81*e* which is fixedly attached to the surface of the felt receiving member 81*a* which faces the drive gear 81*b*. And, the drive gear 81*b* is in mesh with the large diameter gear 77*b*. Thus, there may be produced a frictional force between the drive gear 81*b* and the felt disc 81*e* fixedly attached to the felt disc receiving member 81*a* under the force of the compression spring 81*d*, so that when the drive gear 81*b* rotates due to the rotation of the large diameter gear 77*b*, the follower gear 81*c* also rotates under the influence of this frictional force until the torque acting on the follower gear 81*c* has reached a predetermined value. However, when the torque acting on the follower gear 81*c* has exceeded a predetermined value, there is produced a slippage between the felt disc 81*e* and the drive gear 81*b* so that the rotation transmitting force of the drive gear 81*b* reduces.

The friction gear shaft 80 has one end which extends from the lever 78 toward the gear plate 71 to thereby define a stopper portion 80*a*. And, as shown in FIG. 6, the gear plate 71 is formed with a slit 71*a* of a predetermined shape into which the stopper portion 80*a* of the friction gear shaft 80 may be loosely fitted. The slit 71*a* defines a part of an arc drawn with the shaft 77*c* as a center and the distance between the shaft 77*c* and the friction gear shaft 80 as a radius. Thus, in association with clockwise and counterclockwise rotation of the clutch gear 77, the lever 78 pivots over a predetermined angle determined by a relative motion between the stopper portion 80*a* and the slit 71*a*. A shaft 82 is also fixedly attached to the gear plate 71, and a coupling gear 83 is rotatably mounted on the shaft 82. The coupling gear 83 is a two-stage gear having a lower stage gear 83*b* of a smaller diameter, which is always in mesh with the take-up gear 52*a* of the ink sheet cassette 16, and an upper stage gear 83*a* of a larger diameter, which is brought into mesh with the follower gear 81*c* when the lever 78 pivots counterclockwise in FIG. 6 to have the stopper portion 80*a* brought into engagement with the left-hand side edge of the slit 71*a*. Therefore, during recording, under this condition, the rotation of the follower gear 81*c* is transmitted to the take-up gear 52*a* through the upper and lower stage gears 83*a* and 83*b* so that the support member 52 rotates to have the ink sheet 42 wound around the take-up spool 43. As a result, the lower stage gear 83*b* constitutes a part of the power transmitting train of the facsimile machine 11.

Figure 8:
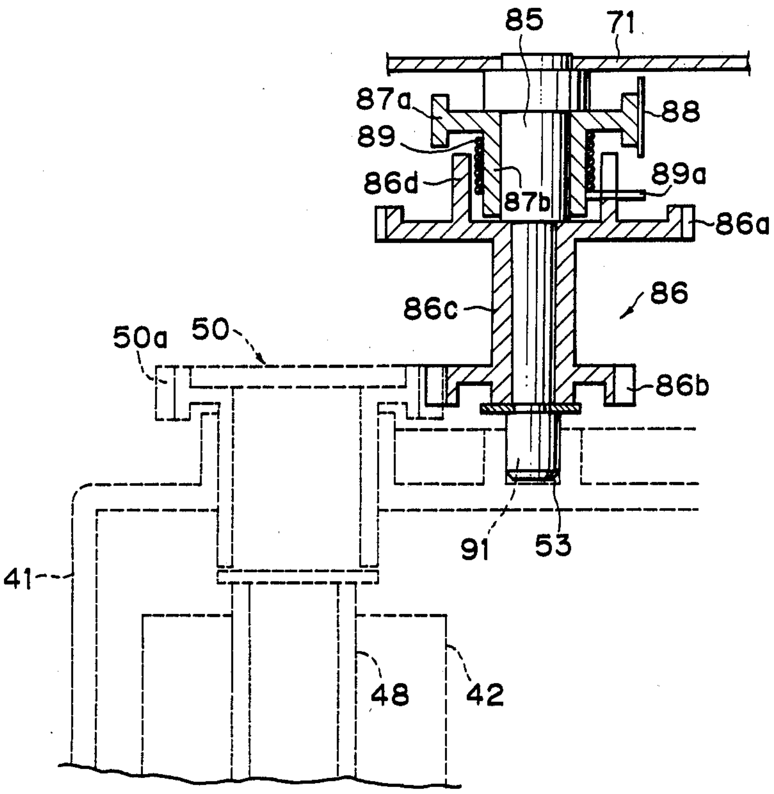
Figure 9:
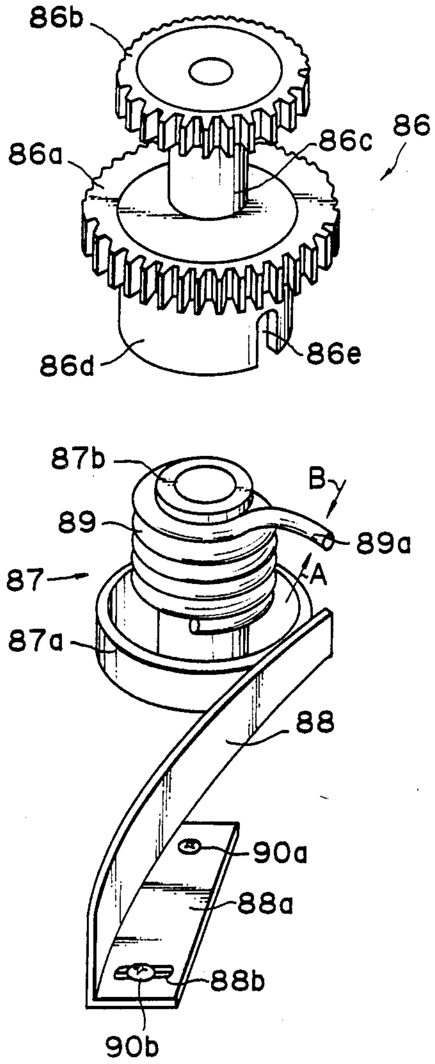
FIG. 9 is a schematic illustration showing in exploded, perspective view a tension mechanism and a release mechanism provided in the drive mechanism shown in FIG. 6.
Figure 10:
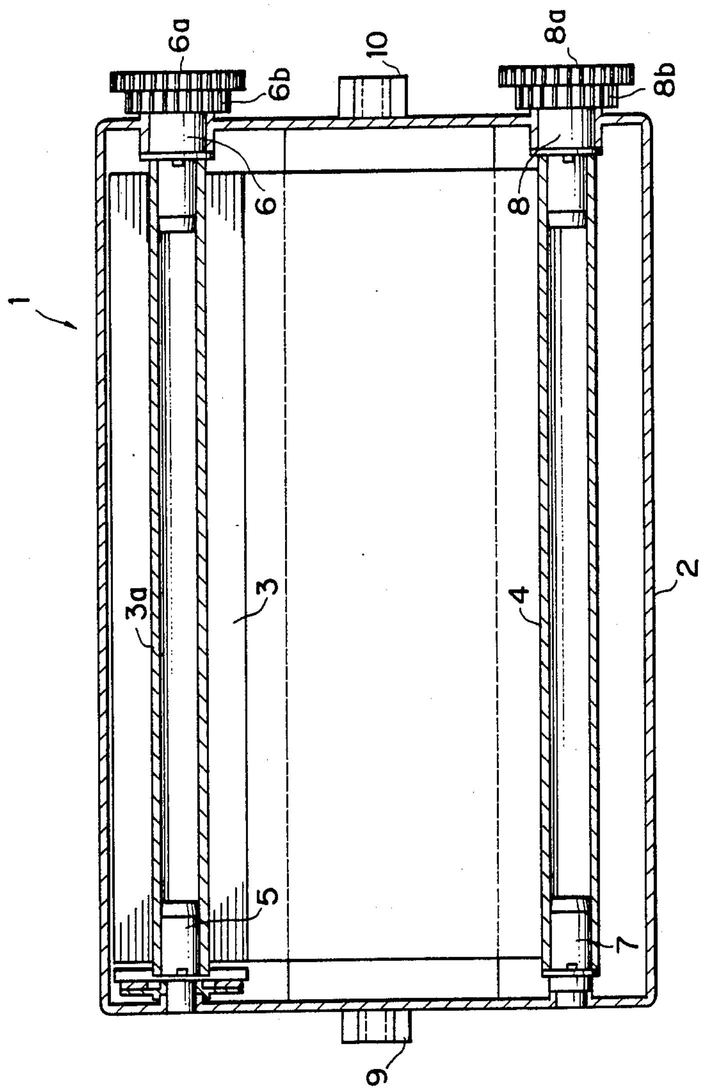
FIG. 10 is a schematic illustration showing an ink sheet cassette for use in a prior proposed thermal recording apparatus.

The shaft 82 which supports the coupling gear 83 has a tip end which projects beyond the coupling gear 83 over a predetermined distance as shown in FIG. 7. And, this projected portion of the shaft 82 defines a pin 84, which is brought into engagement with the pin receiving portion 54 of the ink sheet cassette 16 to support the ink sheet cassette 16 when the ink sheet cassette 16 is set in position in the facsimile machine 11. A shaft 85 is also fixedly planted in the gear plate 71, and the shaft 85 supports a coupling gear 86 as shown in FIG. 8 and a pulley 87 as shown in FIG. 9 rotatably. The coupling gear 86 is a two-stage gear including a large diameter gear 86*a*, a small diameter gear 86*b* and a gear member 86*c* which couples the gears 86*a* and 86*b* together. The coupling gear 86 also includes a cylindrical skirt portion 86*d* extending toward the gear plate 71. The skirt portion 86*d* is formed with an annular groove 86*e* extending axially. The smaller diameter gear 86 of the coupling gear 86 is always in mesh with the rewind gear 50*a* of the ink sheet cassette 16 when the ink sheet cassette 16 is set in position, and the large diameter gear 86*a* is brought into mesh with the follower gear 81*c* when the lever 78 pivots clockwise in FIG. 6 to have the stopper portion 80*a* brought into abutment against the right-hand side edge of the slit 71*a*. That is, the small diameter gear 86*b* constitutes a part of the power transmitting train of the facsimile machine 11.

As shown in FIG. 8, the tip end of the shaft 85 projects over a predetermined distance from the coupling gear 86 and this projected portion of the shaft 85 defines a pin 91, which comes into engagement with the pin receiving portion 53 of the ink sheet cassette 16 when the ink sheet cassette 16 is set in position in the facsimile machine 11. A pulley 87 includes a friction portion 87*a* and a shaft portion 87*b*, and the forward end portion of a leaf spring 88 fixedly attached to the gear plate 71 is in pressure contact with the friction portion 87*a*. A coil spring 89 is provided to be tightly wound around the shaft portion 87*b* and the coil spring 89 has a projection portion 89*a* which may be fitted into the groove 86*e*. The leaf spring 88 is formed with a bracket portion 89*a* which is fixedly attached to the gear plate by means of screws 90*a* and 90*b*. The bracket portion 88*a* is formed with a slot 88*b* through which the screw 90*a* extends, so that the mounting angle of the leaf spring 88 may be adjusted to thereby adjust the spring force to be applied to the friction portion 87*a*. Thus, during recording, i.e., winding of the ink sheet 42, the pulley 87 and the leaf spring 88 together apply a predetermined resistance to the rotation of the support member 50 in the winding direction through the coupling gear 86 to thereby apply a predetermined tension to the ink sheet 42. And, this tension is released by the skirt portion 95*d* of the coupling gear 95, the coil spring 98 and the projected portion 98*a* of the coil spring 98 during rewinding of the ink sheet 42.

Again referring to FIG. 1, use is made of plain paper in the form of a roll as the recording paper 18, and the roll of recording paper 18 is rotatably supported at a predetermined position of the recording unit 17. As described above, the pin 84 formed at a portion of the shaft 82 and the pin 91 formed at a portion of the shaft 85 are provided to be engageable with the pin receiving portions 53 and 54 of the ink sheet cassette 16 in the facsimile machine 11 and two more pins (not shown) are provided in the facsimile machine 11 to be engageable with the pin receiving portions 55 and 56 of the ink sheet cassette 16. Accordingly, when the ink sheet cassette 16 is set in position inside the facsimile machine 11, these four pins including pins 84 and 91 are brought into engagement with the respective four pin receiving portions 53 through 56 of the ink sheet cassette 16 when it is set in position.

Now, an operation for exchanging ink sheet cassettes will be described. In order to replace the ink sheet cassette 16 with a new one, the upper housing 11*a* of the facsimile machine 11 is pivotted open relative to the lower housing 11*b* after releasing a lock (not shown) between the upper and lower housings 11*a* and 11*b*. Thus, the upper housing 11*a* pivots counterclockwise in FIG. 1 around the second support member 35 to thereby have the recording unit 17 exposed. In this instance, the thermal print head 61 is separated away from the platen roller 62 because it moves together with the upper housing 11*a*. As a result, all of the associated components which are disposed above the recording unit 17 are removed so that the used ink sheet cassette 16 may be removed by pulling it upward and then a new ink sheet cassette 16 may be set in position from above. The positioning of the ink sheet cassette 16 in this case is carried out such that the four pin receiving portions 53 through 56 formed on the outer surfaces of the opposite side walls of the cassette case 41 are brought into engagement with the respective four pins, including the above-described pins 84 and 91, which are provided fixed in position in the lower housing 11*b*. In this manner, in accordance with the present invention, since the ink sheet cassette 16 is set in position through engagement between four pins and four pin receiving portions, the ink sheet cassette 16 can be set properly in position with high reliability.

When the ink sheet cassette 16 has been set in position as described above, the rewind gear 50*a* and the take-up gear 52 provided outside of the cassette case 41 are properly brought into mesh with the small diameter gear 86*b* and the lower stage gear 83*b* of the drive mechanism 69, respectively. With this arrangement, the driving force from the drive motor 74 is transmitted to the rewind gear 50*a* and also to the take-up gear 52*a* so that a winding operation of the ink sheet 42 or a rewinding operation of the ink sheet 42 by the drive mechanism 69 can be carried out. In this instance, the platen roller 62 enters into the cassette case 41 through the bottom opening 47 to push the recording paper 18 and the ink sheet 42 upward from below to hold them at a predetermined position. A manner of positioning of the ink sheet cassette 16 in position in the recording unit 17 may be indicated on an outer surface of the cassette case 41, in which case, the ink sheet cassette 16 may be properly set in position in the recording unit 17 even by an operator unskilled and unexperienced.

Then, when the upper housing 11*a* is pivotted closed relative to the lower housing 11*b*, the thermal print head 61 moves into the interior of the cassette case 41 through the top opening 46 and comes into pressure contact with the platen roller 62 inside the cassette case 41. When the upper housing 11*a* is locked to the lower housing 11*b*, a control signal is supplied from the control unit 15 to the drive motor 74 to have the drive motor 74 driven to rotate counterclockwise in FIG. 6 for a predetermined time period, e.g., 1 or 2 seconds. With this, the power of the drive motor 74 is transmitted to the clutch gear 77 through the platen gear 73 and the idle gear 72 and thus the large diameter gear 72 rotates counterclockwise. Because of the counterclockwise rotation of the large diameter gear 77*b*, the lever 78 pivots counterclockwise and thus the follower gear 81*c* is brought into mesh with the upper stage gear 83*a*. Accordingly, the rotation of the clutch gear 77 is transmitted to the upper stage gear 83*a* and the lower stage gear 83*b* through the friction mechanism 81 to thereby have the take-up gear 52*a* rotated, which, in turn, causes the support member 52 to rotate in the take-up or winding direction to have the ink sheet 42 wound around the take-up spool 43.

Thus, during a predetermined time period in which the drive motor 74 rotates counterclockwise, a take-up or winding operation to have the ink sheet 42 wound around the take-up spool 43 is carried out. In this case, the support member 50 rotates clockwise following the winding of the ink sheet 42 around the take-up spool 43, because of the clockwise rotation of the support member 50, the skirt portion 86*d* urges the projected portion 89*a* of the coil spring 89 in the direction indicated by the arrow A in FIG. 9. As a result, the coil spring 89 becomes tightly wound around the shaft 87*b* so that the friction portion 87*a* rotates counterclockwise in unison with the coupling gear 86. However, since the leaf spring 88 is in contact with the friction portion 96*a*, the leaf spring 88 applies a predetermined frictional force against the rotation of the friction portion 87*a*. Accordingly, during winding of the ink sheet 42 around the take-up spool 43, the pulley 87 and the leaf spring 88 apply a predetermined tension to the ink sheet 42 to thereby remove any slack present in the ink sheet 42 extending between the take-up spool 43 and a pinch between the thermal print head 61 and the platen roller 62.

Then, another control signal is supplied from the control unit 15 to the drive motor 74 so that the drive motor 74 is driven to rotate in the clockwise direction in FIG. 6 for a predetermined time period, e.g., 1 or 2 seconds. Thus, the power of the drive motor 74 is transmitted to the idle gear 72 in a similar manner as described above; however, in this case, the idle gear 72 rotates counterclockwise and the large diameter gear **77*b* rotates clockwise. In association with this clockwise rotation of the large diameter gear 77*b*, the lever 78 pivots clockwise so that the follower gear 81*c* is brought into mesh with the upper stage gear 86*a*. Thus, the rotation of the clutch gear 77 is transmitted to the upper stage gear 86*a* and also to the lower stage gear 86*b* through the friction mechanism 81 to thereby cause the support member 50 to rotate, which, in turn, causes the ink sheet 42 to move in the rewinding direction. As a result, during a predetermined time period in which the drive motor 74 rotates clockwise, a rewinding operation of the ink sheet 42 is effected through the supply spool 48 so that any slack present in the ink sheet 42 between the supply spool 48 and a pinch between the thermal print head 61 and the platen roller 62 can be removed and a predetermined back tension can be applied to the ink sheet 42. In this instance, due to the clockwise rotation of the coupling gear 86, the projected portion 89*a* of the coil spring 89 is urged to move in the direction indicated by the arrow B in FIG. 9 so that the coil spring 89 becomes loosened around the shaft 87*b* to establish a decoupling condition between the coil spring 89 and the shaft 87*b*. Thus, the shaft 87*b* comes to rotate freely without constraint of the coil spring 89. In this case, the supply spool 48 can have the ink sheet 42 rewound around the supply spool 48 without receiving an influence of the frictional force between the friction portion 87*a* and the leaf spring 88. Consequently, during rewinding of the ink sheet 42, no unnecessary load is applied to the drive motor 74** and thus the power may be saved.

While in a reception mode, the facsimile machine 11 carries out the above-described winding and rewinding operations of the ink sheet 42 to effect recording on the recording paper 18 page by page. In this case, as described above, since the ink sheet cassette 16 is set in position with its four pin receiving portions 53 through 56 in engagement with the respective four pins, including pins 84 and 91, fixedly provided in the facsimile machine 11, in particular the lower housing **11*a* thereof, the ink sheet cassette 16 can be properly and easily set in position at all times and the rewind gear 50*a* and the take-up gear 52*a* of the ink sheet cassette 16 can be properly and securely brought into mesh with the small diameter gear 86*b* and the lower stage gear 83*b* of the facsimile machine, respectively. Therefore, the ink sheet cassette 16 may be set in position appropriately without any skills and experiences and the ink sheet 42 may be supplied properly and at high accuracy. Furthermore, the facsimile machine 11** can provide a recorded image of improved quality.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A thermal recording apparatus comprising:
a housing;
a thermal print head mounted in said housing;
transporting means mounted in said housing for transporting a sheet or recording paper along a predetermined path including a recording section where said thermal print head is located, said recording paper being pressed against said thermal print head at said recording section;
an ink sheet cassette which may be detachably mounted in position in said housing, said ink sheet cassette including a cassette case of a predetermined shape, a supply spool around which a roll of ink sheet is wound before use and a take-up spool to which a leading end of said ink sheet is fixedly attached, whereby said ink sheet is unwound from said supply spool and wound around said take-up spool after use, a portion of said ink sheet extending between said supply and take-up spools being sandwiched between said recording paper and said thermal print head at said recording section, said cassette case being provided with at least four first engaging means at its outer side surface spaced apart from one another;
supporting means for supporting said ink sheet cassette in position in said housing, said supporting means including at least four second engaging means provided in said housing for engagement with the respective four first engaging means of said ink sheet cassette when said ink sheet cassette is mounted to keep said ink sheet cassette in position in said housing; and
transmitting means for transmitting power at least to said ink sheet cassette when required during operation of said apparatus to thereby have said ink sheet wound or rewound,
wherein said cassette case is generally rectangular in shape and has a pair of opposite side walls each of which is formed with a pair of said first engaging means spaced apart from each other along a longitudinal direction of the side wall, each of said first engaging means includes a pin receiving portion, and four of said second engaging means are provided in said lower housing fixed in position and each of said four second engaging means includes a pin engageable with the corresponding pin receiving portion.

2. The apparatus of claim 1, wherein said housing includes an upper housing and a lower housing and said upper housing is pivotally connected to said lower housing at one end, whereby said upper housing may be pivoted open or closed relative to said lower housing, wherein said thermal print head is mounted in said upper housing and said transporting means, said supporting means and said transmitting means are all mounted in said lower housing.

3. The apparatus of claim 2, further comprising a platen roller which is rotatably mounted in said lower housing and which is brought into pressure contact against said thermal print head when said upper housing is pivotted closed relative to said lower housing with said recording paper and said ink sheet sandwiched therebetween.

4. The apparatus of claim 1, wherein said ink sheet cassette is provided with a pair of first and second gears which are located outside of said cassette case and which are operatively coupled to said supply and take-up spools, respectively, and said transitting means includes a pair of third and fourth gears which are brought into mesh with the respective first and second gears of said ink sheet cassette when said ink sheet cassette has been set in position through engagement between said pins and said pin receiving portions.

* * * * *